United States Patent Office 2,856,388
Patented Oct. 14, 1958

2,856,388

PERCHLOROFLUOROCARBOXYLIC ESTERS AND HOMOPOLYMERS THEREOF

William S. Barnhart, Cranford, and Robert H. Wade, West Paterson, N. J., assignors, by mesne assignments, to Minnesota Mining and Manufacturing Company, St. Paul, Minn., a corporation of Delaware No Drawing. Application March 10, 1955
Serial No. 493,554

20 Claims. (Cl. 260—78.4)

This invention relates to novel esters of perchlorofluorocarboxylic acids and to novel homopolymers of unsaturated esters of perchlorofluorocarboxylic acids.

In accordance with the present invention, novel esters are produced by a variety of procedures, one of which is the direct esterification of a perchlorofluorocarboxylic acid or perchlorofluoro acid chloride with an alcohol, in the presence or absence of a catalyst. Another method for the preparation of these compounds is the alcohol-exchange reaction in which the perchlorofluorocarboxylic acid is reacted with an ester of another acid, for example acetic acid or any other acid having a boiling point lower than that of the perchlorofluorocarboxylic acid. The esters may also be prepared by the acid-exchange reaction in which an alcohol is reacted with an ester of the perchlorofluorocarboxylic acid prepared from a lower boiling alcohol, such as methyl or ethyl alcohol and the like. The ester-interchange reaction, in which an ester of an alcohol with another acid is reacted with an ester of the perchlorofluorocarboxylic acid with another alcohol, may also be used.

The perchlorofluorocarboxylic acids and perchlorofluoro acid chlorides used in the method of this invention may be either mono- or dicarboxylic acids or mono- or diacid chlorides containing from about 4 to about 20 carbon atoms.

The perchlorofluorocarboxylic acids which may be used may be prepared in a variety of ways. For example, they may be produced by subjecting perhalogenated aliphatic olefins having at least 7 carbon atoms and being at least half fluorinated to oxidation conditions in the presence of a vigorous oxygen-containing oxidation reagent, such as free oxygen in the presence of ultraviolet light, free oxygen in the presence of ultraviolet light and elemental chlorine, free oxygen in the presence of elemental fluorine, and permanganate salts in a liquid medium. Preparation of the acids according to this method is disclosed in copending application Serial No. 452,706, filed August 27, 1954.

The acids may also be prepared by subjecting aliphatic perhalogenated high polymers to thermal cracking conditions to produce lower molecular weight materials having molecular weights in the oil or wax range and subjecting these materials to oxidation at a temperature not higher than about 10° C. in the presence of a permanganate salt in a liquid medium. Processes of this type are disclosed in copending application Serial No. 452,704, filed August 27, 1954.

Another method for the preparation of perchlorofluorocarboxylic acids which are useful in the present invention comprises treating fluorine-containing telomers, having the formula $$M(CF_2-CX_1X_2)_nBr$$

in which M is a perhalomethyl radical having a total atomic weight not higher than 146.5, $X_1$ and $X_2$ are fluorine or chlorine atoms, and n is an integer from 2 to 16, with fuming sulfuric acid at a temperature of at least 125° C. This process produces carboxylic acids having the formula $$Z(CF_2-CFCl)_{n-1}CF_2COOH$$

in which Z is a carboxylic acid radical or a perhalomethyl radical having a total atomic weight not in excess of 146.5 and n is an integer from 2 to 16. The preparation of these acids is disclosed in copending application Serial No. 452,703, filed August 27, 1954, now U. S. Patent 2,806,865.

The preferred process for the preparation of perchlorofluorocarboxylic acids useful in the process of the present invention is the hydrolysis of telomers produced by telomerizing perhaloolefins using sulfuryl chloride as a telogen, the preferred telomer being the telomerization product of chlorotrifluoroethylene and sulfuryl chloride. The hydrolyzed telomer has the formula $$Z-CFCl-(CF_2CFCl)_{n-2}-CF_2-COOH$$

in which Z is a carboxylic acid radical or a perhalomethyl radical in which all the halogen atoms are fluorine or chlorine and n is an integer from 2 to 16. The preparation of these acids is disclosed in copending application Serial No. 452,705, filed August 27, 1954, now U. S. Patent 2,806,866.

In some cases it may be desirable to form the esters from perchlorofluoro acid chlorides instead of the corresponding perchlorofluorocarboxylic acids, and if this is the case, the acid chloride may be prepared from the acid by treating the acid with phosphorus trichloride or phosphorus pentachloride.

The alcohols which may be used in the preparation of the novel esters of the invention may contain between about 1 and about 20 carbon atoms. Exemplary alcohols are as follows, and in the cases noted with an asterisk it is preferred to form the ester using the acid chloride rather than the perchlorofluorocarboxylic acid. The alcohols may be saturated aliphatic alcohols of the homologous series methyl, ethyl, propyl, . . . eicosyl alcohols and isomers thereof, and these alcohols may also be halogen substituted with fluorine, chlorine, or bromine to produce alcohols such as dichlorohydrin, or they may be nitrogen substituted, producing alcohols such as 2-dimethylamino ethanol * and diethyl leucinol *.

The alcohols may also be saturated aliphatic polyhydroxy alcohols such as ethylene glycol, glycerol, erythritol, pentaerythritol, penitol * hexitol *, heptitol *, and isomers thereof. These alcohols may also be halogen substituted with fluorine, chlorine, or bromine to produce alcohols such as chloral hydrate and chlorohydrin, or they may be nitrogen substituted to produce alcohols such as triethanolamine.

Unsaturated aliphatic alcohols may also be used such as allyl, crotyl, tiglyl alcohols and the like or 2,3-butadiene-1-ol, geraniol, and isomers thereof. These alcohols may be halogen substituted to produce such alcohols as chloroallyl and bromocrotyl alcohols and fluorohexenol.

Acetylenic alcohols may also be used such as hexynol, pentynol, and methylpropargyl alcohol. Polyhydroxy acetylenic alcohols may also be used such as ethynediol, octynediol, acetylenic triols, and isomers and halogen substituted derivatives thereof.

Phenols and their derivatives such as methylphenol *, ethylphenol *, and the like and isomeric cresols * may be used as well as ortho-hydroxychlorostyrene *, alpha- and beta-naphthols *, and dimethylaminophenol *, Aromatic alcohols such as cinnamyl and benzyl alcohols, and alkylphenoxy ethanols may be used.

Derivatives and isomers of saturated cyclic alcohols may be used such as thujyl alcohol, glycidol, cyclohexanol, menthol, terpin, and inositol.

Derivatives of isomers of unsaturated cyclic alcohols may be used such as terpineol, sabinol, myrtenol, pinocarveol, cyclopentenol, cyclohexenol, and N-methyl pyridonol.

The use of unsaturated alcohols often produces esters which undergo homopolymerization, while those alcohols which are saturated do not produce homopolymerizable esters. When aromatic alcohols are used, it is sometimes desirable to employ a catalyst to facilitate the ester reaction. Exemplary of such catalysts are fluoro acids such as trifluoroacetic acid or sulfonic acids such as chlorosulfonic acid. When the esters are prepared by the reaction of an alcohol with a perchlorofluoro acid, it is desirable in most cases to remove water in order to produce greater yields of the ester.

The reaction temperature employed in the process of the present invention may be between about 0 and about 250° C. and is preferably between about 10 and 100° C., depending upon the solvent and acid used in the reaction. Exemplary of the solvents which may be used in the reaction are an excess of the alcohol involved in the reaction and benzene (as an azeotropic agent for removal of water formed in the reaction).

The esters begin to form as soon as the alcohol is mixed with the perchlorofluorocarboxylic acid or perchlorofluoro acid chloride, and the reaction is run to completion for a time which may be between a few minutes and about 96 hours, preferably between a few minutes and 48 hours. Generally speaking, esterification reactions using the higher molecular weight alcohols require longer reaction times.

The molar ratio of alcohol to acid used in the process of the invention may be between about 20:1 and 1:20, depending upon the alcohol used and the product desired. For example, in cases where a monohydroxy alcohol is reacted with a perchlorofluoromonocarboxylic acid, or a perchlorofluorodicarboxylic acid, or a perchlorofluoro monoacid chloride, or a perchlorofluoro diacid chloride, the alcohol is used in the same molar proportion as the acid or acid chloride or in a slight excess. Therefore, the molar ratio between the alcohol and acid or acid chloride is between 10:1 and 1:1, preferably between 5:1 and 1:1. In those cases where polyhydroxy alcohols are used, however, it is sometimes necessary to have an excess of acid or acid chloride present to insure the reaction of all of the hydroxyl groups, if esterification of all of the hydroxyl groups is desired. The molar ratio of alcohol to acid in these cases is generally between about 1:10 and 1:1, preferably between about 1:1 and 1:5. However, in some cases, for example cellulose, where the number of hydroxyl groups is very high, the ratio is greatly increased in favor of the use of more acid and may go as high as 1:100, or higher.

The use of catalysts generally is not necessary in the alcohol-acid or alcohol-acid chloride type reactions, but they are useful in the ester interchange reactions and in such reactions mineral acid catalysts, such as hydrogen chloride, sulfuric acid, and p-toluene sulfonic acid may be used.

The esters produced by the process of the present invention are useful as plasticizer aids, comonomers, surfactants, plasticizers, monomers for the production of homopolymers, molding lubricants, and as ingredients in polychlorotrifluoroethylene plastics. For example, the esters of the invention may be used as plasticizers for polychlorotrifluoroethylene in the amount of about 1 to 30 parts by weight of ester per 100 parts by weight of polychlorotrifluoroethylene.

The homopolymers of the esters of the invention are useful as liquids for plasticizers or lubricants.

The invention will be further illustrated by reference to the following specific examples:

EXAMPLE 1

*Preparation of* $Cl(CF_2CFCl)_2CF_2COC$

A 215 gram (0.59 mole) portion of $$Cl(CF_2CFCl)_2CF_2COOH$$

was added slowly to phosphorus pentachloride (185 grams $1.5 \times 0.59$ mole) in a round bottom flask fitted with a reflux condenser. After the initial vigorous HCl evolution had ceased, the mixture was heated gently for 2 hours. Pentane (300 ml.) was added to the cooled solution to lessen the $PCl_5$ solubility and the mixture was filtered. The product was distilled to give a 96 percent yield of acid chloride; B. P. 179.5° C.

EXAMPLE 2

*Preparation of* $Cl(CF_2CFCl)_3CF_2COCl$

Phosphorus pentachloride (407 grams; 1.95 moles) was added over a one-half hour period to 960 grams (2.0 moles) of $Cl(CF_2CFCl)_3CF_2COOH$ in a 3 liter flask fitted with $CaCl_2$ tube. There was a vigorous evolution of HCl but the reaction temperature did not exceed 42° C. After heating for 1 hour on a steam bath, $POCl_3$ was removed by heating the flask gradually to 205° C. The clear liquid was transferred to a 1 liter flask and distilled under reduced pressure to give 94 grams of telomer acid (0.2 mole) and 878 grams (1.76 moles; 97.5 percent) of a clear, colorless liquid; B. P. 145° C./50 mm.; $n_D^{20}=1.3964$; $d_4^{20}=1.860$.

*Analysis.*—Calculated for $C_6OCl_5F_{11}$: hydrolyzable Cl, 7.1 percent; N. E., 249.2. Found: hydrolyzable Cl, 6.5; N. E., 247.

EXAMPLE 3

*Preparation of* $Cl(CF_2CFCl)_3CF_2COCl$

Phosphorus pentachloride (2268 grams; 10.9 moles) was added in portions with stirring to 5420 grams (11.3 moles) of $Cl(CF_2CFCl)_3CF_2COOH$ in a 12 liter three-necked flask, provided with a stirrer, a $CaCl_2$ tube, and an HCl trap. The mixture was stirred mechanically for 20 minutes after the final addition of $PCl_5$. The clear solution was transferred to a 5 liter distilling flask and heated until the pot temperature reached 200° C.; 1405 grams of $POCl_3$ were obtained. An additional 248 grams of forerun were collected at reduced pressure. The product was distilled through a 12 inch Vigreux column; B. P. 145° C./50 mm. The yield, based on $PCl_5$, was 5147.5 grams (10.3 moles; 94.5 percent).

EXAMPLE 4

*Preparation of the methyl ester of*

$$Cl(CF_2CFCl)_3CF_2COOH$$

A mixture of $Cl(CF_2CFCl)_3CF_2COOH$ (0.1 mole), methanol (0.3 mole), ethylene chloride (30 ml.), and sulfuric acid (15 ml.) was refluxed for eight hours. The ester was added to ice, extracted quickly with ice-cold sodium hydroxide and distilled; B. P. 131.5–133° C.; $n_D^{20}=1.3952$; $d_4^{20}=1.826$. MR calculated for $C_9Cl_4F_{11}O_2H_3$, 65.44; found, 65.0.

EXAMPLE 5

*Preparation of the methyl ester of*

$$Cl(CF_2CFCl)_2CF_2COOH$$

A solution of 363.4 grams (1 mole) of trichlorooctafluorohexanoic acid and 404 ml. (10 moles) of methanol was refluxed for 5 hours. The refluxing alcohol was recycled to the reaction pot after passing through anhydrous calcium sulfate. The solution was allowed to stand for three days at room temperature. After removing the excess methanol, the product was distilled at reduced pressure. The ester was a colorless liquid with a pleasant, clove-like odor boiling at 87° C./10 mm. The yield was 306.6 grams (81.5 percent); $n_D^{21.5}=1.3834$; $d_4^{20}=1.74$.

Analysis.—Calculated for $C_7H_3O_2Cl_2F_8$: Cl, 28.2; F, 40.3. Found: Cl, 28.2; F, 40.6.

EXAMPLE 6

*Preparation of*

$Cl(CF_2CFCl)_3CF_2COOC_4H_9$

A solution of 240 grams (0.5 mole) of $Cl(CF_2CFCl)_3CF_2COOH$ and 148 grams (2 moles) of n-butyl alcohol was refluxed for 24 hours. About 50 ml. of the butanol-water azeotrope (62–38 percent, B. P. 92.4° C.), along with about 75 ml. of butanol, were allowed to distill during the last three hours of reflux. The solution was cooled and washed first with 5 percent $NaHCO_3$ solution and then with saturated NaCl solution, until neutral. It was then dried over calcium sulfate and distilled under reduced pressure. 225.5 grams (0.42 mole; yield: 84 percent) of a clear, colorless, neutral liquid were obtained, boiling between 105–107° C./0.45 mm.; $n_D^{20}=1.4001$; $d_4^{20}=1.635$.

Saponification equivalent calculated: 536.0. Found: 522.

EXAMPLE 7

*Preparation of*

$Cl(CF_2CFCl)_3CF_2COOCH_2(CH_2)_6CH_3$

To 32.5 grams (0.25 mole) of n-octyl alcohol were added 124.8 grams (0.25 mole) of $Cl(CF_2CFCl)_3CF_2COCl$ over a 15 minute period with swirling. The addition was accompanied by the evolution of HCl and heat. After the removal of a few milliliters of forerun, 137 grams (0.232 mole; yield: 92.5 percent) of a clear, colorless distillate, B. P. 155° C./0.1 mm., were obtained; $n_D^{19}=1.410$; $d_4^{20}=1.41$. Saponification equivalent calculated: 592.2. Found: 583.

EXAMPLE 8

*Preparation of*

$Cl(CF_2CFCl)_3CF_2COOCH_2(CH_2)_{16}CH_3$

Octadecyl alcohol (54.1 grams; 0.2 mole) was added in portions, swirling until dissolved, to 100 grams (0.2 mole) of $Cl(CF_2CFCl)_3CF_2COCl$ on a steam bath. The product was allowed to stand overnight and was then distilled to give 136 grams (0.186 mole; yield: 93 percent) of a very pale yellow, clear liquid; B. P. 200° C./0.1 mm.; $n_D^{19.5}=1.4279$; $d_4^{24}=1.290$.

Saponification equivalent calculated: 732.4. Found: 679 and 686.

EXAMPLE 9

*Preparation of the mono ester of pentaerythritol with*

$Cl(CF_2CFCl)_3CF_2COOH$

A mixture of 41.2 grams (0.3 mole) of pentaerythritol and 145 grams (0.3 mole) of $Cl(CF_2CFCl)_3CF_2COOH$ was heated for 30 hours at 100–110° C. under a reduced pressure of 90–110 mm. A stream of nitrogen was allowed to bubble through the mixture during this period. The white viscous material obtained was stirred with about 300 ml. of 5 percent $NaHCO_3$ and then with several portions of water to remove the unreacted acid and pentaerythritol. Upon heating the taffy-like material overnight at 110° C. under vacuum, it became a clear, almost colorless liquid, which on cooling to room temperature, became cloudy and viscous; $n_D^{21}=1.4217$.

Saponification equivalent calculated: 598. Found: 587.

EXAMPLE 10

*Preparation of*

$n-C_3H_7OOC(CF_2CFCl)_3COO-n-C_3H_7$

A solution of 132 grams (0.3 mole) of $HOOC(CF_2CFCl)_3COOH$ and 144 grams (2.4 moles) of n-propyl alcohol was allowed to reflux for 24 hours. About 50 ml. of n-propyl alcohol-water azeotrope and about 75 ml. of n-propyl alcohol were allowed to distill during the last 3 hours of reflux. The solution was cooled and washed with 5 percent $NaHCO_3$ and then with saturated NaCl solution. It required several portions of 5 percent $NaHCO_3$ to neutralize the product, which was finally dried over calcium sulfate and distilled under reduced pressure. A yield of 78.9 grams (0.17 mole; 57 percent) of a clear, colorless, neutral liquid was obtained; B. P. 118–122° C./0.6 mm.; $n_D^{20}=1.3952$; $d_4^{20}=1.49$.

Saponification equivalent calculated: 261.8. Found: 251.

EXAMPLE 11

*Preparation of*

$CH_3(CH_2)_7OOC(CFClCF_2)_3COO(CH_2)_7CH_3$

A mixture of 178 grams (0.405 mole) of $HOOC(CFClCF_2)_3COOH$ 236 ml. (1.5 moles) of n-octyl alcohol and 100 ml. of benzene was refluxed for 6 hours in an apparatus with provision to remove azeotropic water. After standing overnight, the excess alcohol was removed and the product was distilled through a short path assembly. The product was obtained as an amber liquid; B. P. 180° C./0.07 mm.; $n_D^{19}=1.420$; $d_4^{20}=1.265$. Yield: 154 grams (0.23 mole; 57.5 percent). The product decomposed if the pot temperature exceeded 200° C.

Saponification equivalent calculated: 332. Found: 308 and 314.

EXAMPLE 12

*Preparation of*

$Cl(CF_2CFCl)_3CF_2COO(CH_2)_5OOCCF_2(CFClCF_2)_3Cl$

Pentamethylene glycol (13 grams, 0.125 mole) was added to $Cl(CF_2CFCl)_3CF_2COCl$ (124.5 grams, 0.25 mole). The glycol was insoluble, forming a layer above the acid chloride. However, reaction was effected by warming on a steam bath with intermittent swirling for about one hour. The syrupy solution darkened to an amber color. After standing overnight, starting material was removed by heating to about 150° C./1 mm. Attempts to decolorize the dark amber syrup with alumina failed; $n_D^{20}=1.4118$; $d_4^{20}=1.750$.

Saponification equivalent calculated: 514. Found: 503.

EXAMPLE 13

*Preparation of*

$Cl(CF_2CFCl)_3CF_2COO(CH_2)_5OOC(CF_2CFCl)_3\text{-}$
$COO(CH_2)_5OOC(CF_2CFCl)_3CF_2Cl$ A solution consisting of $Cl(CF_2CFCl)_3CF_2COOH$ (144 grams; 0.3 mole), $HO(CH_2)_5OH$ (34.4 grams; 0.3 mole), and $HOOC(CFClCF_2)_3COOH$ (66 grams; 0.15 mole) was heated at 80–100° C. under 90–110 mm. Hg pressure for 22 hours. A stream of nitrogen was allowed to bubble through this solution, through the course of the reaction. A sample of the resulting amber syrup was shaken with water. The aqueous extract had a pH of about 3 and gave a precipitate with S-benzylthiuronium chloride. The solution was then heated for 5 hours at 100° C. under 1 mm. Hg pressure to remove water; $n_D^{21.5}=1.4157$; $d_4^{20}=1.734$.

Saponification equivalent calculated: 384. Found: 380.

EXAMPLE 14

*Preparation of the allyl ester from* $Cl(CF_2CFCl)_3CF_2COCl$ $Cl(CF_2CFCl)_3CF_2COCl$ (149 grams; 0.3 mole) was added to allyl alcohol (34.8 grams; 0.6 mole) with swirling and cooling while HCl was liberated. The solution was then heated for 0.5 hour on a steam bath and the excess alcohol was removed at about 100 mm. The product was tested and found to be acidic so that it was necessary to wash it with 5 percent $NaHCO_3$ solution and then with saturated aqueous NaCl until it was found to be neutral. The product was then dried over calcium sulfate and finally distilled through a glass helices packed column to give 86.4 grams (0.166 mole; 55.4 percent) of a clear, neutral product; B. P. 160° C./1 mm.; $n_D^{20}=1.4026$; $d_4^{20}=1.704$. Saponification equivalent: Calculated=520; found=513.

EXAMPLE 15

*Preparation of the allyl ester of* $Cl(CF_2CFCl)_2CF_2COOH$

A mixture of 364 grams (1.0 mole) of $Cl(CF_2CFCl)_2CF_2COOH$ and 204 ml. (3 moles) of allyl alcohol was refluxed for 6 hours with gradual removal of 90 ml. of alcohol-water azeotrope (thereby causing the equilibrium to shift to the formation of more ester). After standing, the excess alcohol was removed and the ester was distilled.

The first fraction (174 grams; B. P. 115° C./20 mm.; $n_D^{21}=1.3955$) was found to contain some free starting acid. This material, combined with additional acid-containing distilled material, was washed with 5 percent aqueous $NaHCO_3$ solution and then with water until the washings showed the pH of distilled water. After drying the ester over anhydrous calcium sulfate, it was distilled to yield 257 grams (0.64 mole; 64 percent) of water-clear ester ($n_D^{18}=1.3975$; B. P. 114° C./18 mm.) which gave no precipitate with S-benzylthiuronium chloride, indicating that no organic acids were present.

EXAMPLE 16

*Preparation of the allyl ester of* $Cl(CF_2-CFCl)_2CF_2COOH$

A solution of 182 grams (0.5 mole) of trichlorooctafluorohexanoic acid and 170 ml. (2.5 moles) of allyl alcohol was refluxed for 5 hours, the refluxing alcohol being recycled to the reaction pot after passing through anhydrous calcium sulfate. After standing overnight, the excess allyl alcohol was removed and the product was distilled at reduced pressure. The ester was a colorless liquid with a rather unpleasant odor boiling at 100–101.5° C./10 mm.; yield 164.0 grams (81.5 percent); $n_D^{21.5}=1.3960$; $d_4^{24}=1.62$.

*Analysis.*—Calculated for $C_9H_5O_2Cl_3F_8$: Cl, 26.4; F, 37.6. Found: Cl, 26.4; F, 37.4.

EXAMPLE 17

*Polymerization of the allyl ester of* $Cl(CF_2-CFCl)_2CF_2COOH$

A solution of 10 grams of the allyl ester of trichlorooctafluorohexanoic acid and 0.3 gram of benzoyl peroxide was heated in a steam bath (95° C.) for several hours to give a pale yellow syrupy oil of greater viscosity than the original mobile ester. Further heating at 90° C. produced no apparent change in viscosity.

EXAMPLE 18

*Preparation of the diallyl ester of* $HOOC-(CFCl-CF_2)_3-COOH$

A solution of 132 grams (0.3 mole) of $HOOC-(CFCl-CF_2)_3-COOH$ in 122 ml. (1.04 grams; 1.8 moles) of allyl alcohol was refluxed for a period of 5 hours and 50 ml. of alcohol and alcohol-water azeotrope were gradually removed. An additional 50 mls. of allyl alcohol were added and the solution was refluxed for 21 hours. The excess alcohol was then gradually removed over a period of 4 hours. The solution was cooled, washed with water and then with aqueous $NaHCO_3$ and finally with saturated NaCl solution until the washings were found to be neutral. The organic layer was dried by treatment with calcium sulfate and alumina and distilled to give 83.5 grams (0.16 mole; 53.5 percent) of a clear, colorless, neutral product; B. P. 160° C./6 mm.; $n_D^{20}=1.4068$; $d=1.546$; $MR_D$ calculated 81.8, found 82.7.

EXAMPLE 19

*Polymerization of the diallyl ester of* $HOOC-(CFCl-CF_2)_3COOH$

A solution of 5 grams of $$CH_2=CH-CH_2-OOC-(CFCl-CF_2)_3COOCH_2-CH=CH_2$$

and 50 mg. of benzoyl peroxide in a test tube was heated in a steam bath (95° C.) overnight to give a solid, clear, amber colored polymer. It is easily broken, leaving a smooth, glossy surface at the site of cleavage. The polymer breaks up in acetone but does not appear to dissolve.

EXAMPLE 20

The vinyl ester of the telomer mono- or diacid cannot be made by the alcohol-acid system, since vinyl alcohol is an unstable compound.

The vinyl esters of the chlorofluoro telomer acids can be prepared by passing acetylene through the mono- or diacid at temperatures between 10–70° C. in the presence of an acetylene disulfonic disulfuric acid catalyst (formed by reacting $C_2H_2$ with fuming $H_2SO_4$) or a phosphorus pentoxide-mercuric salt catalyst (formed by reacting HgO with a portion of the telomer acid used in the system).

*Preparation of vinyl 1,2,4-trichlorooctafluorohexanoate*

A 109 gram portion of $Cl(CF_2CFCl)_2CF_2COOH$ and a 3 gram portion of red HgO is stirred and heated, until solution is obtained, in a round bottom flask fitted with a stirrer and a reflux condenser. A 3 gram portion of phosphorus pentoxide is added and the temperature is maintained at 10–20° C. by means of a water bath. Pure acetylene is then bubbled through the solution for a period of about 16 hours, after which the mixture is distilled and fractionated. A clear liquid (52 grams; yield: 44 percent) is obtained.

EXAMPLE 21

*Preparation of the phenyl ester of* $Cl(CF_2CFCl)_3CF_2COCl$

A 14 gram (0.15 mole) portion of phenol is dissolved in 5 percent sodium hydroxide, and 50 grams (0.1 mole) of $Cl(CF_2CFCl)_3CF_2COCl$ is added. The solution is maintained at a temperature of about 20–30° C. for a period of about one hour. The mixture is cooled, extracted with ether and distilled to give a clear liquid product (47 grams; yield: 85 percent).

It will be obvious to those skilled in the art that many modifications may be made within the scope of the present invention without departing from the spirit thereof, and the invention includes all such modifications.

We claim:

1. An ester having the formula $$Z(CF_2-CFCl)_{n-1}CF_2\overset{O}{\underset{\|}{C}}-O-R$$

in which Z is selected from the group consisting of chlorine and perhalomethyl radicals having a total atomic weight not in excess of 146.5, $n$ is an integer from 2 to 10, and R is selected from the group consisting of the halogen and tertiary amino substituted and unsubstituted alkyl, alkenyl, and aryl radicals having not in excess of about 20 carbon atoms.

2. An ester having the formula $$Cl(CF_2\text{—}CFCl)_{n-1}CF_2\overset{O}{\underset{\|}{C}}\text{—}O\text{—}R$$

in which $n$ is an integer from 2 to 10, and R is selected from the group consisting of the halogen and tertiary amino substituted and unsubstituted alkyl radicals having not in excess of about 20 carbon atoms.

3. An ester having the formula $$Cl(CF_2\text{—}CFCl)_{n-1}CF_2\overset{O}{\underset{\|}{C}}\text{—}O\text{—}R$$

in which $n$ is an integer from 2 to 10, and R is selected from the group consisting of the halogen and tertiary amino substituted and unsubstituted alkenyl radicals having not in excess of about 20 carbon atoms.

4. A diester having the formula $$R\text{—}O\text{—}\overset{O}{\underset{\|}{C}}\text{—}CFCl(CF_2\text{—}CFCl)_{n-2}\text{—}CF_2\text{—}\overset{O}{\underset{\|}{C}}\text{—}O\text{—}R$$

in which $n$ is an integer from 2 to 8, and R is selected from the group consisting of the halogen and tertiary amino substituted and unsubstituted alkyl, alkenyl and aryl radicals having not in excess of about 20 carbon atoms.

5. A diester having the formula $$R\text{—}O\text{—}\overset{O}{\underset{\|}{C}}\text{—}CFCl(CF_2\text{—}CFCl)_{n-2}\text{—}CF_2\text{—}\overset{O}{\underset{\|}{C}}\text{—}O\text{—}R$$

in which $n$ is an integer from 2 to 8, and R is selected from the group consisting of the halogen and tertiary amino substituted and unsubstituted alkenyl radicals having not in excess of about 20 carbon atoms.

6. A compound having the formula $$Cl(CF_2CFCl)_3CF_2\overset{O}{\underset{\|}{C}}\text{—}O\text{—}CH_3$$

7. A compound having the formula $$Cl(CF_2CFCl)_3CF_2\overset{O}{\underset{\|}{C}}\text{—}O\text{—}CH_2(CH_2)_{16}CH_3$$

8. A compound having the formula $$Cl(CF_2CFCl)_3CF_2\overset{O}{\underset{\|}{C}}\text{—}O\text{—}CH_2\text{—}C(CH_2OH)_3$$

9. A compound having the formula $$Cl(CF_2CFCl)_3CF_2\overset{O}{\underset{\|}{C}}\text{—}O\text{—}CH_2\text{—}CH\text{=}CH_2$$

10. A compound having the formula $$CH_2\text{=}CH\text{—}CH_2\text{—}O\text{—}\overset{O}{\underset{\|}{C}}\text{—}(CFCl\text{—}CF_2)_3\text{—}\overset{O}{\underset{\|}{C}}\text{—}O\text{—}CH_2\text{—}CH\text{=}CH_2$$

11. A homopolymer of a compound having the formula $$Cl(CF_2\text{—}CFCl)_2CF_2\text{—}\overset{O}{\underset{\|}{C}}\text{—}O\text{—}CH_2\text{—}CH\text{=}CH_2$$

12. A homopolymer of a compound having the formula $$CH_2\text{=}CH\text{—}CH_2\text{—}O\text{—}\overset{O}{\underset{\|}{C}}\text{—}(CFCl\text{—}CF_2)_3\text{—}\overset{O}{\underset{\|}{C}}\text{—}O\text{—}CH_2\text{—}CH\text{=}CH_2$$

13. A process for the preparation of a compound having the formula $$Z(CF_2\text{—}CFCl)_{n-1}CF_2\overset{O}{\underset{\|}{C}}\text{—}O\text{—}R$$

in which Z is selected from the group consisting of chlorine and perhalomethyl radicals having a total atomic weight not in excess of 146.5, $n$ is an integer from 2 to 10, and R is selected from the group consisting of the halogen and tertiary amino substituted and unsubstituted alkyl, alkenyl, and aryl radicals having not in excess of about 20 carbon atoms which comprises reacting at a temperature between about 0 and about 250° C. a compound having the formula $$Z(CF_2\text{—}CFCl)_{n-1}CF_2\overset{O}{\underset{\|}{C}}\text{—}X$$

in which Z and $n$ are as given above and X is selected from the group consisting of chlorine and hydroxyl radicals, with a compound having the formula

ROH in which R is as given above.

14. A process for the preparation of a compound having the formula $$R\text{—}O\text{—}\overset{O}{\underset{\|}{C}}\text{—}CFCl(CF_2\text{—}CFCl)_{n-2}\text{—}CF_2\text{—}\overset{O}{\underset{\|}{C}}\text{—}O\text{—}R$$

in which $n$ is an integer from 2 to 8, and R is selected from the group consisting of the halogen and tertiary amino substituted and unsubstituted alkyl, alkenyl, and aryl radicals having not in excess of about 20 carbon atoms which comprises reacting at a temperature between about 0 and about 250° C. a compound having the formula $$X\text{—}\overset{O}{\underset{\|}{C}}\text{—}CFCl(CF_2\text{—}CFCl)_{n-2}\text{—}CF_2\text{—}\overset{O}{\underset{\|}{C}}\text{—}X$$

in which $n$ is as given above and X is selected from the group consisting of chlorine and hydroxyl radicals, with a compound having the formula

ROH in which R is as given above.

15. A homopolymer of an alkenyl ester having the formula $$Z(CF_2\text{—}CFCl)_{n-1}CF_2\overset{O}{\underset{\|}{C}}\text{—}O\text{—}R$$

in which Z is selected from the group consisting of chlorine and perhalomethyl radicals having a total atomic weight not in excess of 146.5, $n$ is an integer from 2 to 10, and R is selected from the group consisting of the halogen and tertiary amino substituted and unsubstituted alkenyl radicals having not in excess of about 20 carbon atoms.

16. A homopolymer of a dialkenyl ester having the formula $$R\text{—}O\text{—}\overset{O}{\underset{\|}{C}}\text{—}CFCl(CF_2\text{—}CFCl)_{n-2}\text{—}CF_2\text{—}\overset{O}{\underset{\|}{C}}\text{—}O\text{—}R$$

in which $n$ is an integer from 2 to 8, and R is selected from the group consisting of the halogen and tertiary amino substituted and unsubstituted alkyl, alkenyl and aryl radicals having not in excess of about 20 carbon atoms.

17. A process which comprises reacting at a temperature between about 0 and about 250° C. a compound selected from the group consisting of an alcohol and a phenol having from 1 to 20 carbon atoms with a compound having the formula.

$$Z(CF_2\text{—}CFCl)_{n-1}CF_2\overset{O}{\underset{\|}{C}}\text{—}X$$

in which Z is selected from the group consisting of chlorine and perhalomethyl radicals having a total atomic weight not in excess of 146.5, $n$ is an integer from 2 to 10, and X is selected from the group consisting of chlorine and hydroxyl radicals.

18. A process which comprises reacting at a temperature between 0 and about 250° C. a compound selected from the group consisting of an alcohol and a phenol having from 1 to 20 carbon atoms with a compound having the formula $$X-\overset{O}{\underset{\|}{C}}-CFCl(CF_2-CFCl)_{n-2}-CF_2-\overset{O}{\underset{\|}{C}}-X$$

in which $n$ is an integer from 2 to 8 and X is selected from the group consisting of chlorine and hydroxyl radicals.

19. An ester having the formula $$\left[Z(CF_2CFCl)_{n-1}-CF_2-\overset{O}{\underset{\|}{C}}-O\right]_m-R$$

in which Z is selected from the group consisting of chlorine and perhalomethyl radicals having a total atomic weight not in excess of 146.5, $n$ is in integer from 2 to 10, R is a polyvalent acyclic saturated aliphatic hydrocarbon radical, and $m$ is an integer from 2 to 4.

20. An ester having the formula $$Z(CF_2-CFCl)_{n-1}CF_2-\overset{O}{\underset{\|}{C}}-O-R-O-\overset{O}{\underset{\|}{C}}(CF_2CFCl)_{n-1}\overset{O}{\underset{\|}{C}}-O-R-O-\overset{O}{\underset{\|}{C}}(CF_2CFCl)_{n-1}CF_2Z$$

in which Z is selected from the group consisting of chlorine and a perhalomethyl radical having a total atomic weight not in excess of 146.5, $n$ is an integer from 2 to 10, and R is a divalent acyclic saturated aliphatic hydrocarbon radical.

References Cited in the file of this patent

UNITED STATES PATENTS

| | | |
|---|---|---|
| 2,539,438 | Kropa et al. | Jan. 30, 1951 |
| 2,583,415 | Chaney | Jan. 22, 1952 |
| 2,592,069 | Reid et al. | Apr. 8, 1952 |

FOREIGN PATENTS

| | | |
|---|---|---|
| 601,807 | Great Britain | May 12, 1948 |

OTHER REFERENCES

McBee et al.: Ind. and Eng. Chem., vol. 39, No. 3, pp. 415–417 (1947).

UNITED STATES PATENT OFFICE
Certificate of Correction

Patent No. 2,856,388 October 14, 1958

William S. Barnhart et al.

It is hereby certified that error appears in the printed specification of the above numbered patent requiring correction and that the said Letters Patent should read as corrected below.

Column 4, line 6, for "*Preparation of* $Cl(CF_2CFCl)_2CF_2COC$" read —*Preparation of* $Cl(CF_2CFCl)_2CF_2COCl$—; column 5, line 44, for "$n_D^{19}=1.410$" read —$n_D^{19}=1.4104$—.

Signed and sealed this 14th day of April 1959.

[SEAL]

Attest:
KARL H. AXLINE,
*Attesting Officer.*

ROBERT C. WATSON,
*Commissioner of Patents.*